(12) United States Patent
Finkelstein

(10) Patent No.: US 12,057,957 B2
(45) Date of Patent: Aug. 6, 2024

(54) SYSTEMS AND METHODS FOR MULTIPLE SPECTRUM PLANS ON A SINGLE CABLE SEGMENT

(71) Applicant: Cox Communications, Inc., Atlanta, GA (US)

(72) Inventor: Jeffrey Finkelstein, Atlanta, GA (US)

( * ) Notice: Subject to any disclaimer, the term of this patent is extended or adjusted under 35 U.S.C. 154(b) by 228 days.

(21) Appl. No.: 17/661,535

(22) Filed: Apr. 29, 2022

(65) Prior Publication Data

US 2023/0353408 A1 Nov. 2, 2023

(51) Int. Cl.
*H04L 12/28* (2006.01)
*H04L 5/00* (2006.01)

(52) U.S. Cl.
CPC ........ *H04L 12/2801* (2013.01); *H04L 5/0092* (2013.01)

(58) Field of Classification Search
CPC .............. H04L 12/2801; H04L 5/0092; H04L 12/4633; H04L 5/0094; H04L 5/0044
See application file for complete search history.

(56) References Cited

U.S. PATENT DOCUMENTS

| | | | | |
|---|---|---|---|---|
| 2002/0115421 | A1* | 8/2002 | Shahar | H04W 28/18 455/403 |
| 2015/0029869 | A1* | 1/2015 | Wolcott | H04B 3/487 370/242 |
| 2018/0234196 | A1* | 8/2018 | Klopfenstein | H04L 12/2801 |
| 2020/0413325 | A1* | 12/2020 | Meredith | H04W 48/16 |

* cited by examiner

*Primary Examiner* — Walli Z Butt
(74) *Attorney, Agent, or Firm* — Eversheds Sutherland (US) LLP

(57) ABSTRACT

Disclosed are systems and methods for multiple spectrum plans on a single cable segment. An example method may include causing, by a processor, to send an indication to a first customer premises device (CPE) of a Data Over Cable Service Interface Specification (DOCSIS) network to transmit and receive data outside of a second frequency range, wherein the first CPE is configured to transmit and receive data over the DOCSIS network using a first frequency spectrum, wherein the first CPE is configured to transmit upstream data in a first frequency range between a first frequency and the second frequency, and wherein the DOCSIS network further comprises a second CPE configured to transmit and receive data on the DOCSIS network using a second frequency spectrum, wherein the second CPE is configured to transmit upstream data in a second frequency range between the second frequency and a third frequency.

20 Claims, 9 Drawing Sheets

SYSTEMS AND METHODS FOR MULTIPLE SPECTRUM PLANS ON A SINGLE CABLE SEGMENT

BACKGROUND

Within a Data Over Cable Service Interface Specification (DOCSIS) cable network, many different cable modems representing different DOCSIS versions and spectrum usage capabilities may exist. This may lead to challenges associated with data transmission and/or receipt if multiple different devices associated with different spectrum plans are included on a single cable segment.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Figure 1:
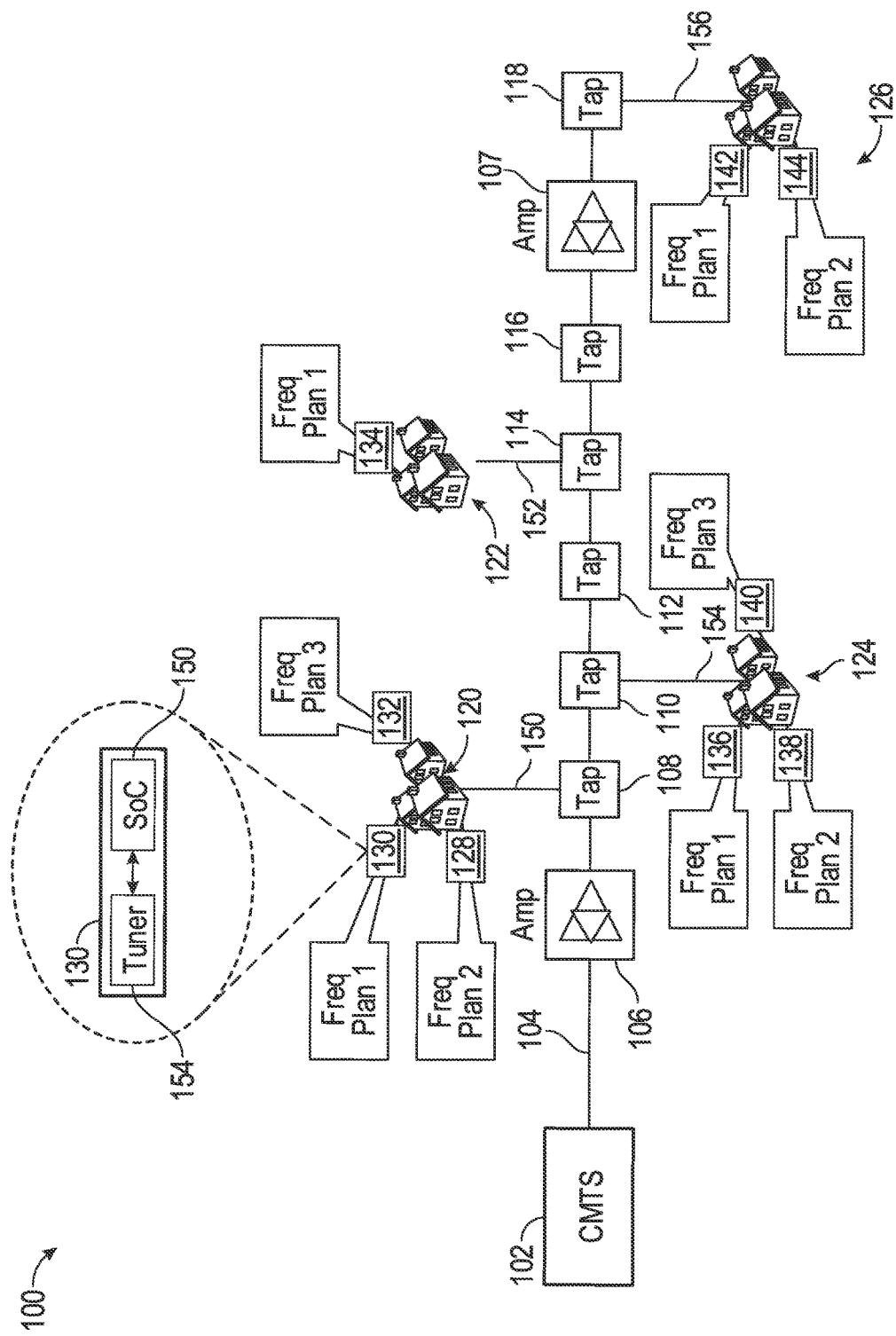
FIG. 1 depicts an example network architecture, in accordance with one or more example embodiments of the disclosure.

The disclosure is directed to, among other things, systems and methods for multiple spectrum plans on a single cable segment. The systems and methods described herein may be applicable to a DOCSIS network, however, such systems and methods may also similarly be applicable to any other type of network as well. A "spectrum plan" may refer to an allocation of different portions of a frequency spectrum that may be used for downstream and/or upstream transmissions between a cable modem termination system (CMTS), which may be found at a headend of the network, and any customer premises equipment (CPE) (for example, a modem at a customer household, which may also be referred to as a "CM" herein). The spectrum plan may similarly pertain to communications between any other types of devices as well.

Depending on the spectrum plan (which may be based on the version of DOCSIS that a device operates in accordance with, among other factors), a device may be instructed to allocate different segments (for example, frequency ranges) within an overall frequency spectrum in which to transmit and/or receive data. Non-limiting examples of different types of spectrum plans may include a sub-split, a mid-split, a high-split, or an ultra-high-split spectrum plan. For example, a mid-split spectrum plan may allocate frequencies between 5 MHz and 85 MHz for upstream data transmissions. Additionally, the mid-split spectrum plan may allocate frequencies beyond approximately 108 MHz for downstream transmissions. This is merely an example of the frequency ranges that may be used and any other frequency range may also be applicable. Additionally, different frequencies may be allocated for upstream and/or downstream transmissions based on the type of spectrum plan. That is, not every spectrum plan may allocate frequencies between 5 MHz and 85 MHz for upstream data transmissions. Furthermore, the allocated upstream and downstream frequencies may be further segmented into sub-ranges of frequencies for different types of transmissions. For example, with a mid-split spectrum plan, some of the downstream frequencies may be allocated to video data, some of the downstream frequencies may be allocated to data associated with DOCSIS 3.0, some of the downstream frequencies may be allocated to data associated with DOCSIS 3.1, etc. An illustration of these frequency allocations for different spectrum plans may be provided in FIGS. 4A and 5A.

The existence of these different spectrum plans may lead to challenges associated with data transmission and/or receipt if multiple different devices associated with different spectrum plans are included on a single cable segment (as one non-limiting example, if a single customer household downstream from a tap device includes multiple different devices operating in accordance with multiple DOCSIS versions). For example, a first device associated with a sub-split spectrum plan may be expecting downstream video transmissions within a given range of frequencies. However, if a second device is associated with a mid-split spectrum plan, then the range of frequencies allocated for upstream transmissions associated with the second device may overlap with a portion of the given range of frequencies for the first device. This may result in a situation where the first device is expecting video transmissions of 0 dB, but may actually receive a signal within this frequency range at 30 or 40 dB. Overlapping frequency ranges associated with different spectrum plans may result in packet collisions, among other potential problems. For example, if a CPE is expecting a 0 dB signal, but receives a 30-40 dB signal, this may result in less effective data processing.

In one or more embodiments, in order to mitigate or prevent any potential discrepancies caused by including multiple devices associated with different spectrum plans on a single cable segment, the systems and methods described herein may involve instructing different devices (for example, CPEs and/or any other device in the network) to leave particular portions of the frequency spectrum unused, even if those portions are typically allocated for upstream and/or downstream data transmissions for a given type of spectrum plan. Specifically, and as described in additional detail with respect to at least FIGS. 2-3, new and/or modified fields within MAC management messages may be used to notify such devices which portions of the spectrum are available to them. This may allow multiple spectrum plans to co-exist on the same cable segment without forcing a customer to upgrade all CPEs to devices that use the most recent version of DOCSIS and a spectrum plan associated with the highest transmission speeds. In other words, legacy devices may still be used without resulting in discrepancies resulting from different types of data transmissions being sent and/or received by the different devices within similar frequency ranges.

In one or more embodiments, a device may leave a portion of the frequency spectrum unused by disregarding any data that is received in the portion of the frequency spectrum and/or not transmitting data in the portion of the frequency spectrum. This data may be filtered using any suitable hardware and/or software within the CPE. For example, the data in the portion of the frequency spectrum may be filtered out through a tuner in the CPE, a channelizer in the CPE, an analog to digital converter in the CPE, and/or through any other hardware and/or software.

Turning to the figures, FIG. 1 depicts an example network architecture 100, in accordance with one or more example embodiments of the disclosure.

In one or more embodiments, the example network architecture 100 may include at least a device 102, one or more amplifiers (for example, amplifiers 106, 107, and/or any other number of amplifiers), one or more taps (for example, taps 108, 110, 112, 114, 116, 118, and/or any other number of taps), and/or one or more households (for example, households 120, 122, 124, 126, and/or any other number of households) associated with a number of different customer premises equipment (CPEs) (for example, CPEs 128, 130, 132, 134, 136, 138, 140, 142, 144, and/or any other number of CPEs). In some cases, the device 102 may include a cable modem termination system (CMTS) located at a headend, which can also be referred to as an access controller, a controller, and/or a node herein. In one or more embodiments, the device can have a converged cable access platform (CCAP) functionality. In one or more embodiments, the device 102 may serve as remote physical (PHY) device, that is, a device having PHY layer functionality (that is, PHY layer functionality as described in connection with the open systems interconnection model, OSI model).

In one or more embodiments, there may be a fiber 104 connected to the device 102. The device 102 can further be connected to various network cable taps 108, 110, 112, 114, 116, and 118 (as well as any other number of taps), also referred to as taps or terminations herein, and can connect to various cable CPE (CM) devices, for example, at various households 120, 122, 124, 126 (and/or any other number of households).

In some embodiments, a cable network can include a fiber optic network, which may extend from the headend out to a neighborhood's hubsite, and finally to a coaxial cable node which serves customers, for example, 25 to 2000 households (or any number of other households, or even commercial buildings).

In one or more embodiments, data can be transmitted downstream from the device 102 to one or more homes over drop cables (also referred to as drops herein) (for example, drops 150, 152, 154, 156, and/or any other drops) using the one or more taps 108, 110, 112, 114, 116, and 118 (as well as any other number of taps). In one or more embodiments, as the data is transmitted downstream from the device 102 to one or more homes, the taps can potentially generate various impairments on the network. Alternatively or additionally, as the signals pass through from the device 102 to the taps 108, 110, 112, 114, 116, and 118 (as well as any other number of taps) over fibers 104 and to the homes over one or more drops, the fibers 104 and/or the drops can cause the signals to undergo various impairments, for example, to the power spectral density of the signals. In one or more embodiments, the impairment can be due to attenuation on the fibers 104 and/or drops. In one or more embodiments, the impairments can lead to frequency distortions on the signals; for example, the higher frequency end of the signals may be attenuated. Accordingly, in one or more embodiments, one or more amplifiers (not shown) can be used to perform a gain on the attenuated signals. In one or more embodiments, the one or more amplifiers (for example, amplifier 106, amplifier 107, and/or any other number of amplifiers) can be placed, for example, at one or more of the taps 108, 110, 112, 114, 116, and 118 (as well as any other number of taps) to perform the gain on the attenuated signals.

In one or more embodiments, the devices in the homes can include any number of different devices associated with any number of different spectrum plans. For example, CPE 128 may be a modem that is associated with a sub-split frequency plan (described in additional detail herein), CPE 130 may be a modem that is associated with a mid-split frequency plan (described in additional detail herein), and CPE 132 may be a modem that is associated with a high-split frequency plan (described in additional detail herein).

Figure 2:
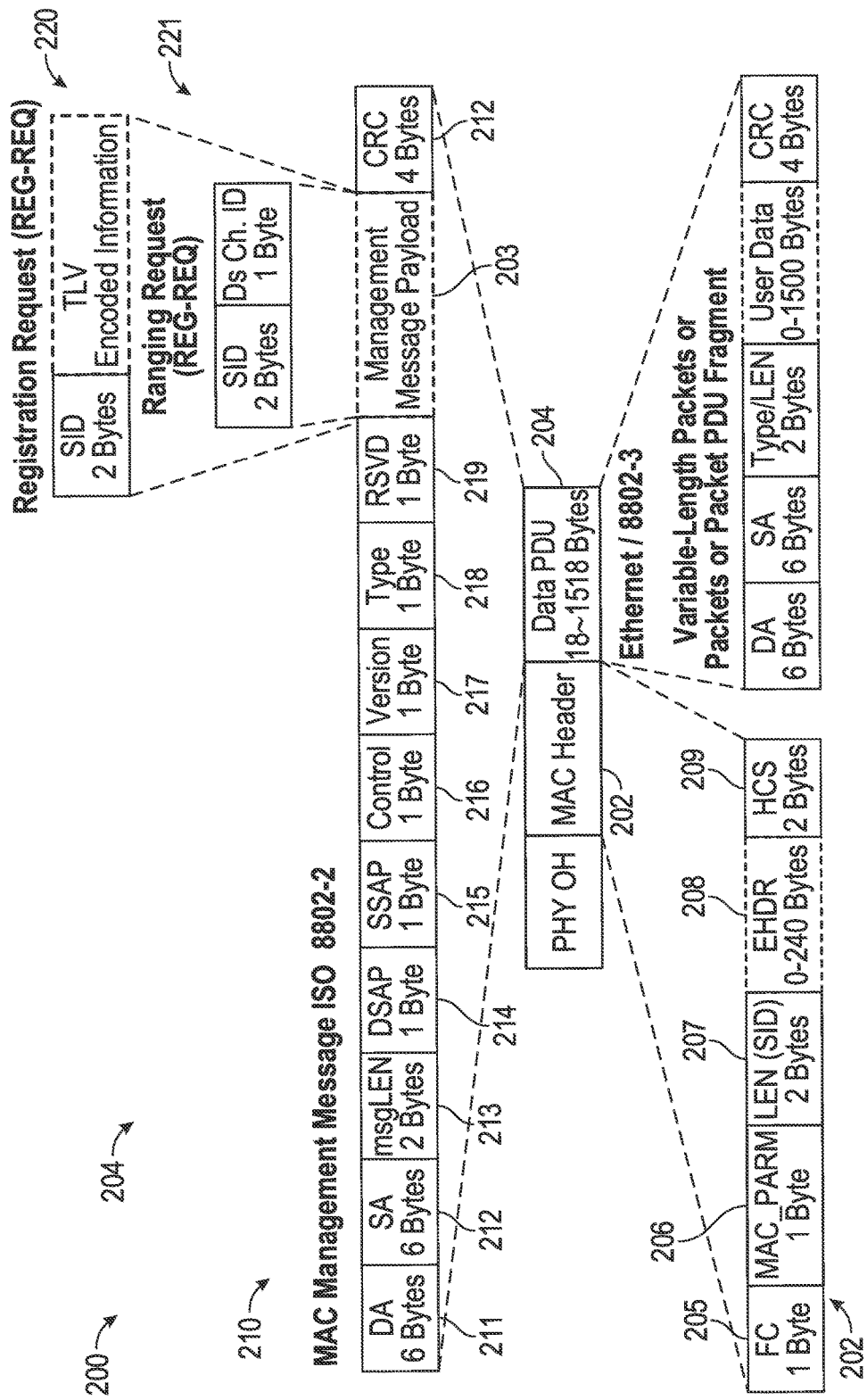
FIG. 2 depicts an example MAC management message, in accordance with one or more example embodiments of the disclosure.

FIG. 2 depicts an example MAC management message 200, in accordance with one or more example embodiments of the disclosure.

In one or more embodiments, a MAC management message 200 may include a MAC header 202 and/or a data protocol data unit (PDU) 204. It should be noted that the MAC management message and the fields that comprise the MAC management message may be further defined within the MAC and Upper Layer Protocols Specification for DOCSIS 3.1, for example (and/or any other relevant specification associated with any other version of DOCSIS). Additionally, the MAC management message 200 may include any other fields not described herein as well. Finally, any description of any fields presented in association with the MAC management message 200 is only intended to be exemplary and is not intended to be limiting in any way. For example, the fields may include other information and may be different sizes depending on the version of DOCSIS that is being employed.

The MAC header 202 may be a portion of the MAC management message 200 that may be used by a CM or CMTS (and/or any other device and/or system) to facilitate the transmission of the MAC management message 200. The MAC header 202 may include at least a frame control field 205, a parameter field 206, a length field 207, an extended MAC header field 208, a header check sequence field 209, and/or any other number of fields and/or combination of different types of fields.

In one or more embodiments, the frame control field 205 may identify a type of MAC header. A few non-limiting examples may include a MAC header with packet PDU, a MAC header with packet PDU Isolation from Pre-3.0 DOCSIS cable modems, or a MAC header used for specific MAC control purposes. The parameter field 206 may be used for various purposes depending on the frame control field 205. As one non-limiting example, if the MAC header 202 is a request MAC header, then the parameter field 206 may indicate an amount of bandwidth being requested. The length field 207 may indicate the length of the MAC frame. In some cases, the length field 207 may also be used to indicate a cable modem's service identifier as well. The extended MAC header field 208 may provide additional bytes to allow for a variable length MAC header. The header check sequence field 209 may provide a check sequence for the MAC header (for example, to ensure the integrity of the MAC header 202.

The PDU 204 may include at least a MAC management message header 210, a message payload 203, a CRC field 212, as well as any other fields.

In one or more embodiments, the MAC management message header 210 may include a destination address (DA) field 211, a source address (SA) field 212, a message length field 213, a DSAP field 214, an SSAP field 215, a control field 216, a version field 217, a type field 218, an RSVD field 219, and/or any other number of fields. The DA field 211 may provide an indication of a device to which the message is being transmitted. The SA field 212 may provide an indication of the source CM, CMTS, and/or any other device and/or system from which the message is being transmitted. The message length field 213 may provide an indication of the length of the MAC message (for example, a number of bits or bytes). The DSAP field 214 may be a field that indicates a logical address of a network layer entity that created the message. The SSAP field 215 may be a field that indicates a logical address of a network layer entity that is to receive the message. The control field 216 may define types and formatting of data in the PDU 204. The version field 217 may be used to indicate the version of DOCSIS that is applicable to the MAC management message 200. The type field 218 may be used to indicate a message number associated with the MAC management message 200.

In one or more embodiments, the message payload 211 may include a registration request 220 and/or a ranging request 221. The registration request 220 may include at least an SID 222 and/or one or more TLV encoded information fields 223. The ranging request 221 may include at least an SID 224 and/or a DS channel ID field 224. A ranging request 221 may be a message that is periodically sent from a CPE to the CMTS. The CMTS may analyze the signal quality of the ranging request 221 and send back any necessary RF adjustments in a range response message. This may allow for the DOCSIS network to adjust based on any change in RF attenuation and gain, for example. The registration request 220 may include a list of TLV (type length value) parameters indicative of how the CPE is configured to communicate on the network. If the CMTS approves of the CPE's settings, the CMTS may respond with a registration response indicating a successful registration.

The cyclic redundancy check CRC field 212 may be used to ensure the integrity of the MAC message header 210.

Figure 3:
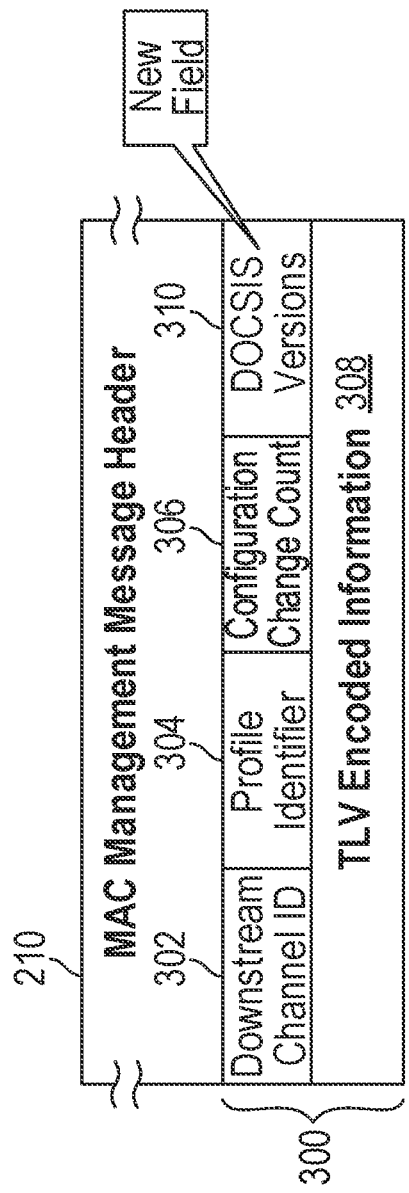
FIG. 3 depicts an example downstream channel descriptor, in accordance with one or more example embodiments of the disclosure.

FIG. 3 depicts an example downstream channel descriptor (DCD) 300, in accordance with one or more example embodiments of the disclosure.

In one or more embodiments, The DCD 300 may be an example of a type of message that may be included within the management message payload 203 shown in FIG. 2. The DCD may include information relating downstream parameters including, for example, modulation, symbol rate, channel width, and frequency. Particularly, the DCD may include at least a downstream channel ID field 302, a profile identifier field 304, a configuration change count field 306, and/or TLV encoded information 308. As aforementioned, the contents of the DCD may be further described with respect to the MAC and Upper Layer Protocols Specification for DOCSIS 3.1, for example (and/or any other relevant specification associated with any other version of DOCSIS).

Figures 4A, 4B:
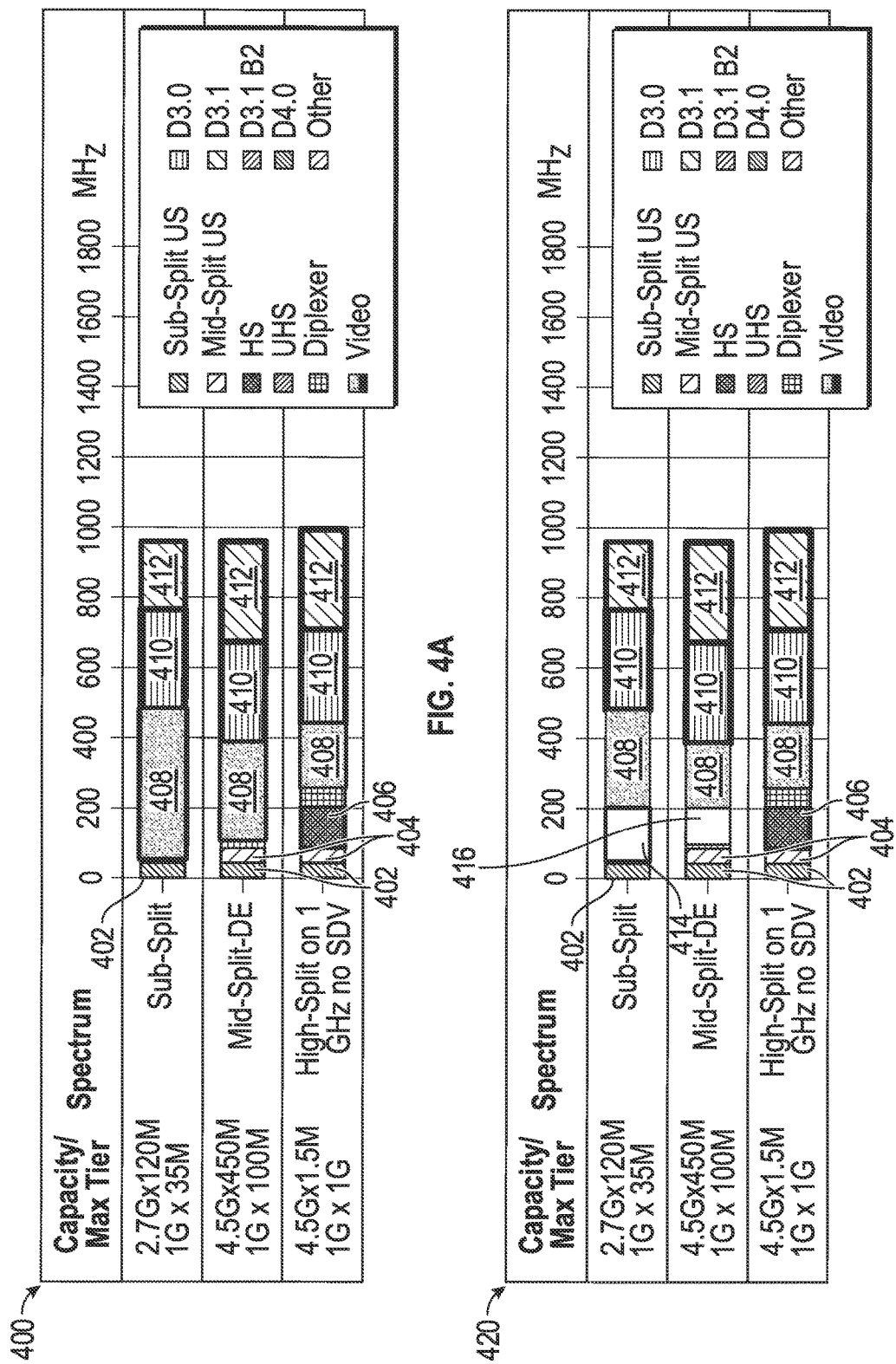
FIGS. 4A-4B depict example spectrum allocations, in accordance with one or more example embodiments of the disclosure.
Figure 5A:
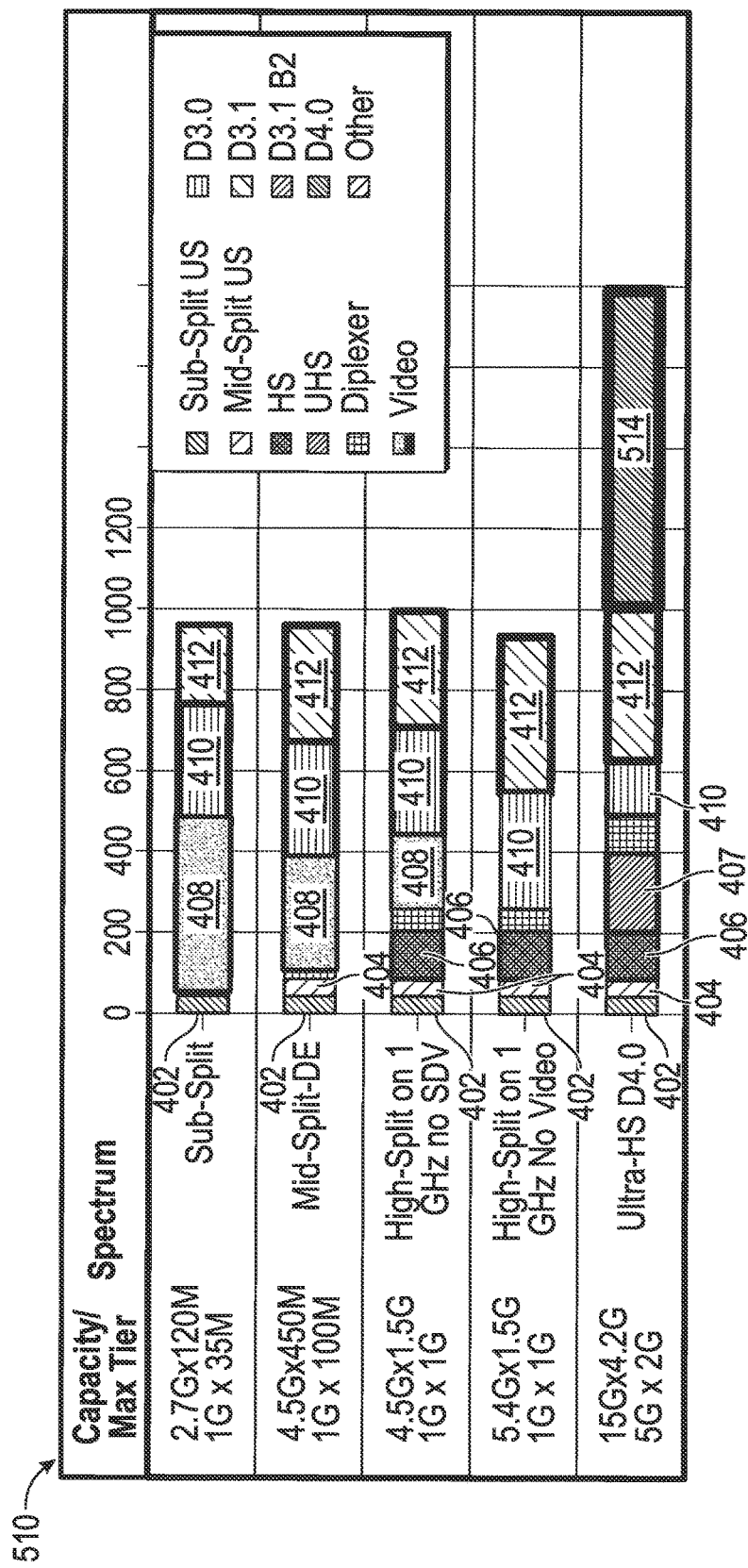
FIGS. 5A-5B depict example spectrum allocations, in accordance with one or more example embodiments of the disclosure.

In accordance with the systems and methods described herein, in addition to the aforementioned fields that may often be included in a DCD 300, a DOCSIS versions field 310 may also be used within the DCD 300. This DOCSIS versions field 310 may be used to provide an indication of the DOCSIS version (for example, DOCSIS 3.0, DOCSIS 3.1, DOCSIS 4.0, and/or any other version of DOCSIS that is pertinent to the data that is being transmitted. In this manner, devices operating on different spectrum plans (as illustrated in FIG. 1) may be provided with an indication of the specific transmission parameters associated with their particular spectrum plan. This may allow for multiple spectrum plans to co-exist on the same cable segment without forcing an all-in strategy of upgrading all CPE equipment before enabling the new frequencies. For example, a legacy DOCSIS 3.0 device may still be used within the same household as a DOCSIS 4.0 device. This may also be applicable to devices that operate in accordance with the same version of DOCSIS, but use different spectrum plans (as illustrated in FIGS. 4A and 5A).

In addition to the use of the DOCSIS versions field 310, the DCD 300 as described herein may also differ in the number of times it is transmitted to any downstream devices (for example, customer premises equipment (CPE), such as cable modems as a customer household). Typically, DCD messages 300 in a DOCSIS network may only be sent once. However, with the use of the DOCSIS versions field 310 as described herein, the DCD message 300 may instead be sent multiple times. That is, one (or multiple) DCD messages 300 may be sent to the CPEs for each different version of DOCSIS. For example, one DCD message 300 may be sent to the CPEs with the DOCSIS versions field 310 indicating DOCSIS 3.0 and including data specific to a spectrum plan for that particular version of DOCSIS. One DCD message 300 may be sent to the CPEs with the DOCSIS versions field 310 indicating DOCSIS 3.1 and including data specific to a spectrum plan for that particular version of DOCSIS. Any other number of DCD messages 300 may also be sent as well. In some cases, these different DCD messages 300 may be sent to all of the CPEs associated with a single cable segment (for example, all devices that may be downstream from a common tap device (as shown in FIG. 1). However, in some cases, DCD messages 300 associated with a particular DOCSIS version may only be sent to the CPEs for which that particular DOCSIS version is relevant (for example, a DCD message 300 with a DOCSIS versions field 310 indicating DOCSIS 3.0 may only be sent to DOCSIS 3.0 devices, etc. The DCD messages 300 may also be sent to any other combination of devices, including devices across multiple taps, as well.

In one or more embodiments, the information included in the DCD messages 300 may also be used by the CPEs to determine which frequencies should be filtered out when transmitting and/or receiving data. As mentioned above, different spectrum plans may include different frequency allocations for different types of data. Given this, if multiple of such spectrum plans exist on the same cable segment, having one frequency range that may be associated with one type of data for one spectrum plan and another type of data for another spectrum plan may lead to problems with data transmission on that cable segment. For example, a first device associated with a sub-split spectrum plan may be expecting downstream video transmissions within a given range of frequencies. However, if a second device is associated with a mid-split spectrum plan, then the range of frequencies allocated for upstream transmissions associated with the second device may overlap with a portion of the given range of frequencies for the first device. This may result in a situation where the first device is expecting video transmissions 0 dB, but may actually receive a signal within this frequency range at 30 or 40 dB. Overlapping frequency ranges associated with different spectrum plans may result in packet collisions, among other potential problems. For example, if a CPE is expecting a 0 dB signal, but receives a 30-40 dB signal, this may result in less effective data processing. An example manner in which the filtering may be performed is described with respect to FIG. 6. Additionally, examples of different types of spectrum plans that may exist are provided with respect to FIGS. 4-5.

In one or more embodiments, a similar approach may also be applied to any upstream channel descriptor (UCD) messages. That is, while the DCD messages may be used to provide an indication to any CPEs as to what frequencies may be used for downstream transmissions, the UCD messages may be used to provide an indication as to what frequencies may be used for upstream transmissions. This same information may similarly be transmitted in one or more registration response messages, one or more ranging response messages, and/or any other type of message transmitted in accordance with any version of DOCSIS as well. Similar to the DCD, the contents of any of the UCD, registration response messages, and/or ranging response messages may be defined in the MAC and Upper Layer Protocols Specification for DOCSIS 3.1, for example (and/or any other relevant specification associated with any other version of DOCSIS).

In some cases, the UCD may be device-specific. That is, multiple of such UCD messages may be sent to a single CPE, with each UCD including an indication of a specific DOCSIS version and information associated with the upstream transmission of data associated with that particular DOCSIS version. For example, multiple UCD messages may be transmitted to the CPE for each different version of DOCSIS. In this manner, the CPE may have information about how to transmit based on any other DOCSIS versions. However, in some cases, a UCD may be transmitted to the CPE with a specific version of DOCSIS indicated in the DOCSIS version field to instruct the CPE to transmit in accordance with that specific version of DOCSIS. In certain scenarios, a CPE may be configured to transmit data in accordance with one version of DOCSIS (for example, DOCSIS 4.0), however, the network may not have the capability to manage transmissions on that particular version of DOCSIS. Thus, the UCD may be transmitted indicating the version of DOCSIS that the network is configured to handle (for example, DOCSIS 3.1). Thus, even though the CPE may be capable of transmitting in accordance with DOCSIS 4.0, the CPE may instead transmit in accordance with DOCSIS 3.1 based on the indication provided in the DOCSIS version field of the UCD. However, if the capability for transmissions in accordance with DOCSIS 4.0 were to become available, then a second UCD may be transmitted to the CPE with the DOCSIS version field set to DOCSIS 4.0. These are just a few non-limiting use cases of this DOCSIS version field that may be included within the UCD (and/or any other type of message as indicated herein or otherwise) and are not intended to be limiting.

FIGS. 4A-4B depict example spectrum allocations (for example, spectrum allocation 400 and spectrum allocation 420), in accordance with one or more example embodiments of the disclosure.

Beginning with FIG. 4A, the spectrum allocation 400 may represent typical spectrum allocations for different spectrum plans for a DOCSIS network. The spectrum allocations may each be separated into frequency ranges associated with upstream transmissions and frequency ranges associated with downstream transmissions. For example, a small frequency range near the lower end of the usable spectrum may be allocated to upstream transmission. The allocated frequency range may vary depending on the spectrum plan. For example, a sub-split spectrum may be associated with a first upstream frequency range 402. A mid-split spectrum plan may be associated with the first upstream frequency range 402 in addition to a second upstream frequency range 404. A high-split spectrum plan may be associated with the first upstream frequency range 402, the second upstream frequency range 404, and a third upstream frequency range 406.

The remaining frequency range for each spectrum plan may be allocated to downstream transmissions. For example, each spectrum plan may be associated with a fourth frequency range 408 for video transmissions, a fifth frequency range 410 for transmissions in accordance with DOCSIS 3.0, and a sixth frequency range 412 for transmissions in accordance with DOCSIS 3.1. The comparison of the spectrum plans illustrate a potential challenge with including multiple devices on different spectrum plans within a single cable segment. For example, a first device associated with a sub-split spectrum plan may be expecting downstream video transmissions in the fourth frequency range 408. However, if a second device is associated with a mid-split spectrum plan, then the frequency range associated with upstream transmissions associated with the second device may overlap with a portion of the fourth frequency range 408 for the first device. This may result in a situation where the first device is expecting video transmissions 0 dB, but may actually receive a signal within this frequency range at 30 or 40 dB. Overlapping frequency ranges associated with different spectrum plans may result in packet collisions, among other potential problems. For example, if a CPE is expecting a 0 dB signal, but receives a 30-40 dB signal, this may result in less effective data processing.

FIG. 4B illustrates a spectrum allocation 420 that serves to mitigate or eliminate these potential challenges associated with using multiple devices with different spectrum plans. In the spectrum allocation 420, certain portions of the downstream for the sub-split spectrum plan and the mid-split spectrum plan may be unused to avoid any potential overlap between different frequency range allocations that differ between the different spectrum plans. Particularly, the downstream frequency allocations from certain spectrum plans that overlap with upstream frequency allocations for other spectrum plans may be unused to avoid any potential complications. For example, a first sub-range 414 of the fourth frequency range 408 associated with the sub-split spectrum plan may be unused. Additionally, a second sub-range 416 of the fourth frequency range 408 associated with the mid-split spectrum plan may be unused as well. In this manner, a device associated with a mid-split spectrum plan may be able to transmit data in the upstream direction without conflicting with the downstream video transmissions associated with the fourth frequency range 408 of the sub-split spectrum plan. Similarly, the device associated with a high-split spectrum plan may be able to transmit data in the upstream direction without conflicting with the downstream video transmissions associated with the fourth frequency range 408 of the sub-split spectrum plan and the mid-split spectrum plan.

In one or more embodiments, one or more devices may be informed of portions of allocated frequency ranges for which they should not receive and/or transmit any data through any of the different types of messages described herein or otherwise. For example, as described with respect to FIGS. 2-3, frequency allocation information may be provided in MAC management messages through downstream channel descriptors, upstream channel descriptors, and/or any other type of message. Such messages may include an indication of a relevant version of DOCSIS and/or spectrum plan and may provide an indication as to which frequency ranges a device operating in accordance with that version of DOCSIS and/or spectrum plan should ignore.

Figure 5B:
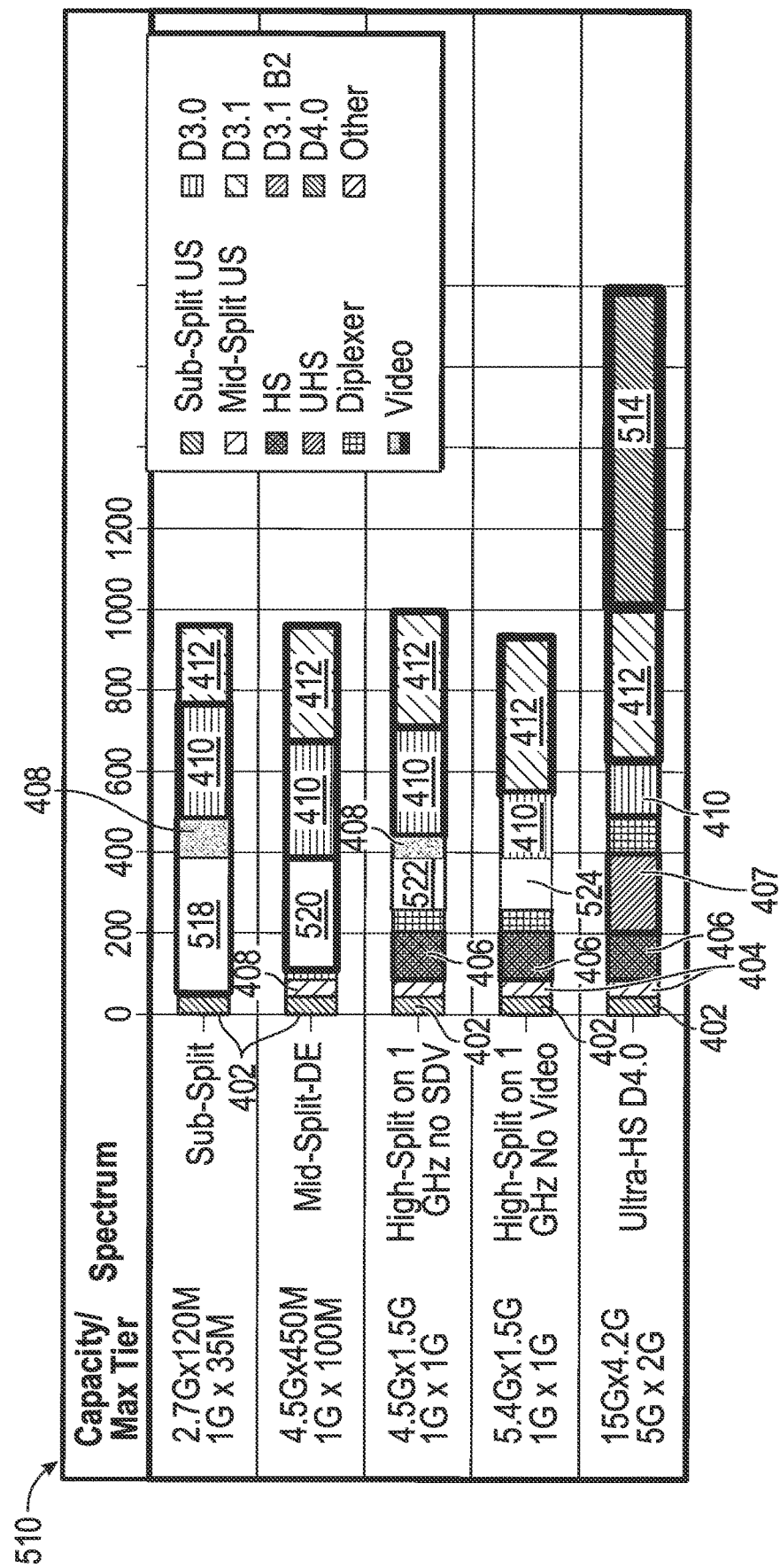

FIGS. 5A-5B depict example spectrum allocations (for example, spectrum allocation 500 and spectrum allocation 520), in accordance with one or more example embodiments of the disclosure. The spectrum allocations 500 and 520 may be similar to the spectrum allocations 400 and 420 illustrated with respect to FIGS. 4A-4B, however, may also include additional spectrum plans (for example, a high-split spectrum plan with no downstream video and/or an ultra-high split associated with DOCSIS 4.0).

As depicted in FIG. 5A, the high-split spectrum plan with no video may be similar to the high-split spectrum plan, but may only include the fifth frequency range 410 and sixth frequency range 412. Additionally, the ultra-high-split spectrum plan may include an additional seventh frequency range 407 used for ultra-high-speed upstream transmissions. Given this, the frequency ranges that are filtered out by devices using other spectrum plans may be larger than those depicted with respect to FIG. 4B. For example, devices associated with a sub-split spectrum plan may leave a first sub-range 518 unused. This first-sub-range 5187 may be a larger range of frequencies than the first-subrange 414 illustrated in FIG. 4B. Devices associated with a mid-split spectrum plan may leave a second sub-range 520 unused. Devices associated with a high-split spectrum plan may leave a third sub-range 522 unused. Devices associated with a high-split spectrum plan with no video may leave the same third sub-range 522 unused. The only distinction is that this third sub-range may include a portion of the fifth frequency range 410 for the high-split spectrum plan with no video.

Figure 6:
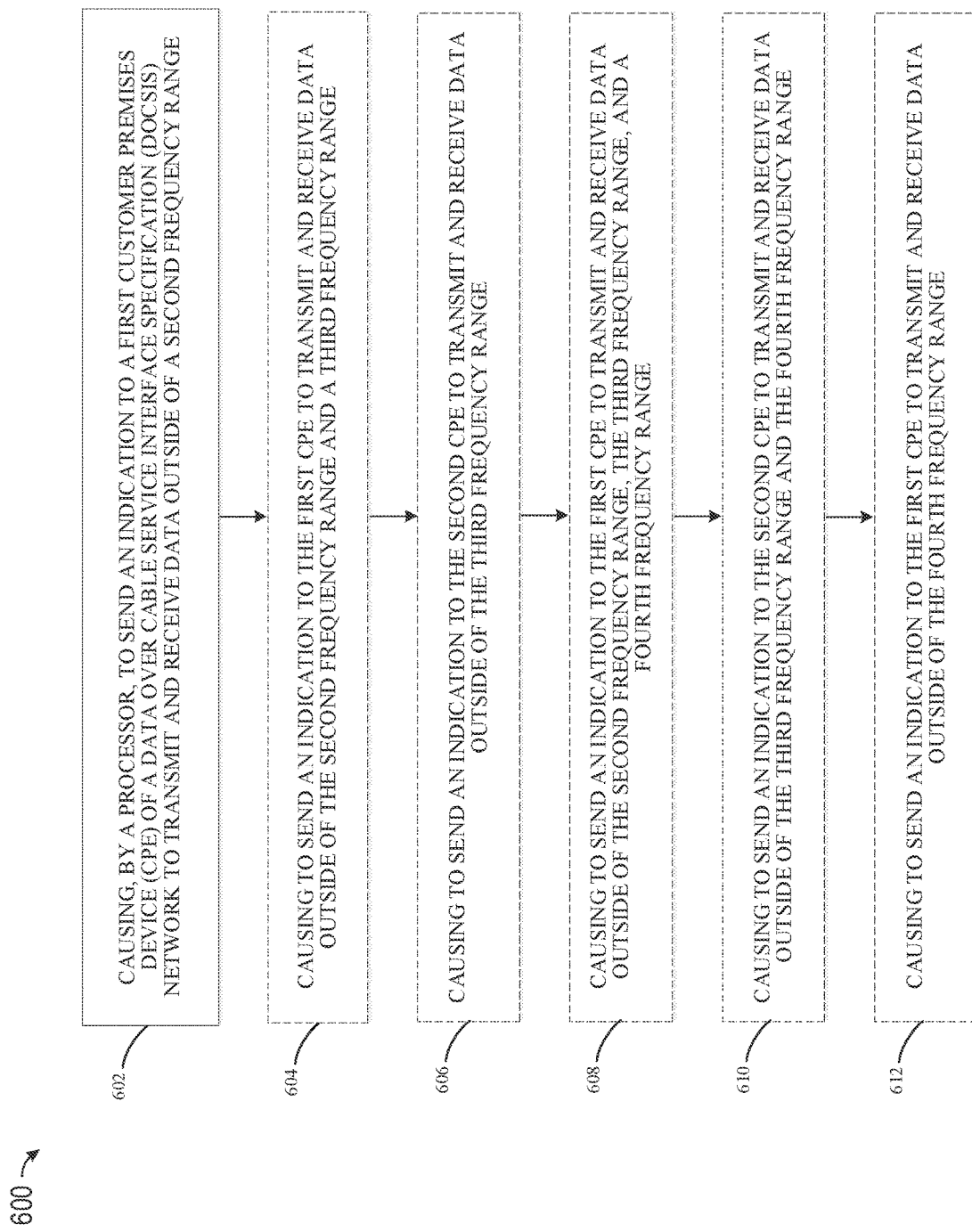
FIG. 6 depicts a flowchart of an example method, in accordance with one or more example embodiments of the disclosure.

FIG. 6 is an example method 600. At block 602 of the method 600 in FIG. 6, the method may include causing, by a processor, to send an indication to a first customer premises device (CPE) of a Data Over Cable Service Interface Specification (DOCSIS) network to transmit and receive data outside of a second frequency range, wherein the first CPE is configured to transmit and receive data over the DOCSIS network using a first frequency spectrum, wherein the first CPE is configured to transmit upstream data in a first frequency range between a first frequency and the second frequency, and wherein the DOCSIS network further comprises a second CPE configured to transmit and receive data on the DOCSIS network using a second frequency spectrum, wherein the second CPE is configured to transmit upstream data in a second frequency range between the second frequency and a third frequency.

In one or more embodiments, the DOCSIS network further comprises a third CPE configured to transmit and receive data on the DOCSIS network using a third frequency spectrum, wherein the third CPE is configured to transmit upstream data in a third frequency range between the third frequency and a fourth frequency, and the method 600 further includes causing to send an indication to the first CPE to transmit and receive data outside of the second frequency range and the third frequency range. The method 600 may also include causing to send an indication to the second CPE to transmit and receive data outside of the third frequency range In one or more embodiments, the DOCSIS network further comprises a fourth CPE configured to transmit and receive data on the DOCSIS network using a fourth frequency spectrum, wherein the fourth CPE is configured to transmit upstream data in a fourth frequency range between the fourth frequency and a fifth frequency, and the method 600 further includes causing to send an indication to the first CPE to transmit and receive data outside of the second frequency range, the third frequency range, and the fourth frequency range. The method 600 may also include causing to send an indication to the second CPE to transmit and receive data outside of the third frequency range and the fourth frequency range. The method 600 may also include causing to send an indication to the first CPE to transmit and receive data outside of the fourth frequency range.

In one or more embodiments, causing to send the indication further includes providing an indication of a first DOCSIS protocol version within a first downstream channel description message, wherein the first downstream channel description message is sent to the first CPE and the second CPE. In one or more embodiments, causing to send the indication further includes providing an indication of a second DOCSIS protocol version within a second downstream channel description message, wherein the first DOCSIS protocol version and second DOCSIS protocol version are different. In one or more embodiments, causing to send the indication further includes providing an indication of a first DOCSIS protocol version within a first upstream channel description message. In one or more embodiments, the first CPE and the second CPE include a first modem and a second modem, wherein the first modem and second modem are both downstream from a single tap device in the DOCSIS network.

The operations described and depicted in the illustrative process flows of FIG. 6 may be carried out or performed in any suitable order as desired in various example embodiments of the disclosure. The operations described and depicted in the illustrative process flows of FIG. 6 may be carried out or performed by any devices described herein, such as the management computing entity 800 described with respect to FIG. 8, as well as any other device described herein). Additionally, in certain example embodiments, at least a portion of the operations may be carried out in parallel. Furthermore, in certain example embodiments, less, more, or different operations than those depicted in FIG. 6 may be performed.

One or more operations of the process flows of FIG. 6 may have been described above as being performed by a user device, or more specifically, by one or more program modules, applications, or the like executing on a device. It should be appreciated, however, that any of the operations of process flows of FIG. 6 may be performed, at least in part, in a distributed manner by one or more other devices, or more specifically, by one or more program modules, applications, or the like executing on such devices. In addition, it should be appreciated that processing performed in response to execution of computer-executable instructions provided as part of an application, program module, or the like may be interchangeably described herein as being performed by the application or the program module itself or by a device on which the application, program module, or the like is executing.

Figure 7:
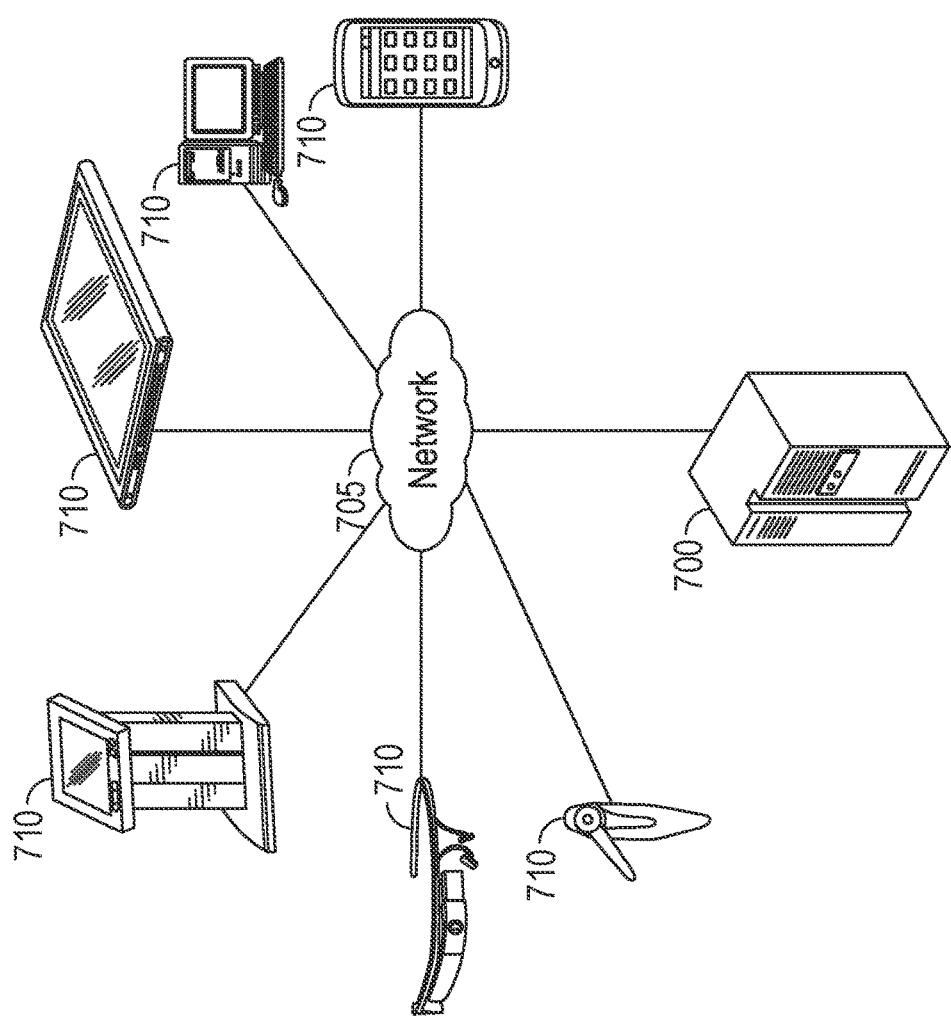
FIG. 7 depicts an example computing entity, in accordance with one or more example embodiments of the disclosure.

FIG. 7 illustrates an example computing device 700, in accordance with one or more embodiments of this disclosure. The computing device 700 may be a device used to perform any of the processing with respect to the flare artifact score determination or any other processing described herein. The computing device 700 may include at least one processor 702 that executes instructions that are stored in one or more memory devices (referred to as memory 704). The instructions can be, for instance, instructions for implementing functionality described as being carried out by one or more modules and systems disclosed above or instructions for implementing one or more of the methods disclosed above. The processor(s) 702 can be embodied in, for example, a CPU, multiple CPUs, a GPU, multiple GPUs, a TPU, multiple TPUs, a multi-core processor, a combination thereof, and the like. In some embodiments, the processor(s) 702 can be arranged in a single processing device. In other embodiments, the processor(s) 702 can be distributed across two or more processing devices (e.g., multiple CPUs; multiple GPUs; a combination thereof; or the like). A processor can be implemented as a combination of processing circuitry or computing processing units (such as CPUs, GPUs, or a combination of both). Therefore, for the sake of illustration, a processor can refer to a single-core processor; a single processor with software multithread execution capability; a multi-core processor; a multi-core processor with software multithread execution capability; a multi-core processor with hardware multithread technology; a parallel processing (or computing) platform; and parallel computing platforms with distributed shared memory. Additionally, or as another example, a processor can refer to an integrated circuit (IC), an ASIC, a digital signal processor (DSP), a FPGA, a PLC, a complex programmable logic device (CPLD), a discrete gate or transistor logic, discrete hardware components, or any combination thereof designed or otherwise configured (e.g., manufactured) to perform the functions described herein.

The processor(s) 702 can access the memory 704 by means of a communication architecture 706 (e.g., a system bus). The communication architecture 706 may be suitable for the particular arrangement (localized or distributed) and type of the processor(s) 702. In some embodiments, the communication architecture 706 can include one or many bus architectures, such as a memory bus or a memory controller; a peripheral bus; an accelerated graphics port; a processor or local bus; a combination thereof; or the like. As an illustration, such architectures can include an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, a Peripheral Component Interconnect (PCI) bus, a PCI-Express bus, a Personal Computer Memory Card International Association (PCMCIA) bus, a Universal Serial Bus (USB), and or the like.

Memory components or memory devices disclosed herein can be embodied in either volatile memory or non-volatile memory or can include both volatile and non-volatile memory. In addition, the memory components or memory devices can be removable or non-removable, and/or internal or external to a computing device or component. Examples of various types of non-transitory storage media can include hard-disc drives, zip drives, CD-ROMs, digital versatile discs (DVDs) or other optical storage, magnetic cassettes, magnetic tape, magnetic disk storage or other magnetic storage devices, flash memory cards or other types of memory cards, cartridges, or any other non-transitory media suitable to retain the desired information and which can be accessed by a computing device.

As an illustration, non-volatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The disclosed memory devices or memories of the operational or computational environments described herein are intended to include one or more of these and/or any other suitable types of memory. In addition to storing executable instructions, the memory 704 also can retain data.

Each computing device 700 also can include mass storage 708 that is accessible by the processor(s) 702 by means of the communication architecture 706. The mass storage 708 can include machine-accessible instructions (e.g., computer-readable instructions and/or computer-executable instructions). In some embodiments, the machine-accessible instructions may be encoded in the mass storage 708 and can be arranged in components that can be built (e.g., linked and compiled) and retained in computer-executable form in the mass storage 708 or in one or more other machine-accessible non-transitory storage media included in the computing device 700. Such components can embody, or can constitute, one or many of the various modules disclosed herein. Such modules are illustrated as modules 714.

Execution of the modules 714, individually or in combination, by at least one of the processor(s) 702, can cause the computing device 700 to perform any of the operations described herein (for example, the operations described with respect to FIG. 6, as well as any other operations).

Each computing device 700 also can include one or more input/output interface devices 710 (referred to as I/O interface 710) that can permit or otherwise facilitate external devices to communicate with the computing device 700. For instance, the I/O interface 710 may be used to receive and send data and/or instructions from and to an external computing device. The computing device 700 also includes one or more network interface devices 712 (referred to as network interface(s) 712) that can permit or otherwise facilitate functionally coupling the computing device 700 with one or more external devices. Functionally coupling the computing device 700 to an external device can include establishing a wireline connection or a wireless connection between the computing device 700 and the external device. The network interface devices 712 can include one or many antennas and a communication processing device that can permit wireless communications. Such a communication processing device can process data according to defined protocols of one or several radio technologies. The radio technologies can include, for example, 3G, Long Term Evolution (LTE), LTE-Advanced, 5G, IEEE 802.11, IEEE 802.16, Bluetooth, ZigBee, near-field communication (NFC), and the like.

In some embodiments, the computing device 700 may be in communication with an imaging device 716 (for example, through the I/O interface 710 of the computing device as shown in FIG. 7). The imaging device 716 may be the same as any of the imaging devices described herein (for example, an imaging device for which a flare artifact score is determined based on one or more images that the imaging device captures).

As used in this application, the terms "environment," "system," "unit," "module," "architecture," "interface," "component," and the like refer to a computer-related entity or an entity related to an operational apparatus with one or more defined functionalities. The terms "environment," "system," "module," "component," "architecture," "interface," and "unit," can be utilized interchangeably and can be generically referred to functional elements. Such entities may be either hardware, a combination of hardware and software, software, or software in execution. As an example, a module can be embodied in a process running on a processor, a processor, an object, an executable portion of software, a thread of execution, a program, and/or a computing device. As another example, both a software application executing on a computing device and the computing device can embody a module. As yet another example, one or more modules may reside within a process and/or thread of execution. A module may be localized on one computing device or distributed between two or more computing devices. As is disclosed herein, a module can execute from various computer-readable non-transitory storage media having various data structures stored thereon. Modules can communicate via local and/or remote processes in accordance, for example, with a signal (either analogic or digital) having one or more data packets (e.g., data from one component interacting with another component in a local system, distributed system, and/or across a network such as a wide area network with other systems via the signal).

As yet another example, a module can be embodied in or can include an apparatus with a defined functionality provided by mechanical parts operated by electric or electronic circuitry that is controlled by a software application or firmware application executed by a processor. Such a processor can be internal or external to the apparatus and can execute at least part of the software or firmware application. Still in another example, a module can be embodied in or can include an apparatus that provides defined functionality through electronic components without mechanical parts. The electronic components can include a processor to execute software or firmware that permits or otherwise facilitates, at least in part, the functionality of the electronic components.

In some embodiments, modules can communicate via local and/or remote processes in accordance, for example, with a signal (either analog or digital) having one or more data packets (e.g., data from one component interacting with another component in a local system, distributed system, and/or across a network such as a wide area network with other systems via the signal). In addition, or in other embodiments, modules can communicate or otherwise be coupled via thermal, mechanical, electrical, and/or electro-mechanical coupling mechanisms (such as conduits, connectors, combinations thereof, or the like). An interface can include input/output (I/O) components as well as associated processors, applications, and/or other programming components.

Further, in the present specification and annexed drawings, terms such as "store," "storage," "data store," "data storage," "memory," "repository," and substantially any other information storage component relevant to the operation and functionality of a component of the disclosure, refer to memory components, entities embodied in one or several memory devices, or components forming a memory device. It is noted that the memory components or memory devices described herein embody or include non-transitory computer storage media that can be readable or otherwise accessible by a computing device. Such media can be implemented in any methods or technology for storage of information, such as machine-accessible instructions (e.g., computer-readable instructions), information structures, program modules, or other information objects.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

What has been described herein in the present specification and annexed drawings includes examples of systems, devices, techniques, and computer program products that, individually and in combination, permit the automated provision of an update for a vehicle profile package. It is, of course, not possible to describe every conceivable combination of components and/or methods for purposes of describing the various elements of the disclosure, but it can be recognized that many further combinations and permutations of the disclosed elements are possible. Accordingly, it may be apparent that various modifications can be made to the disclosure without departing from the scope or spirit thereof. In addition, or as an alternative, other embodiments of the disclosure may be apparent from consideration of the specification and annexed drawings, and practice of the disclosure as presented herein. It is intended that the examples put forth in the specification and annexed drawings be considered, in all respects, as illustrative and not limiting. Although specific terms are employed herein, they are used in a generic and descriptive sense only and not for purposes of limitation.

Figure 8:
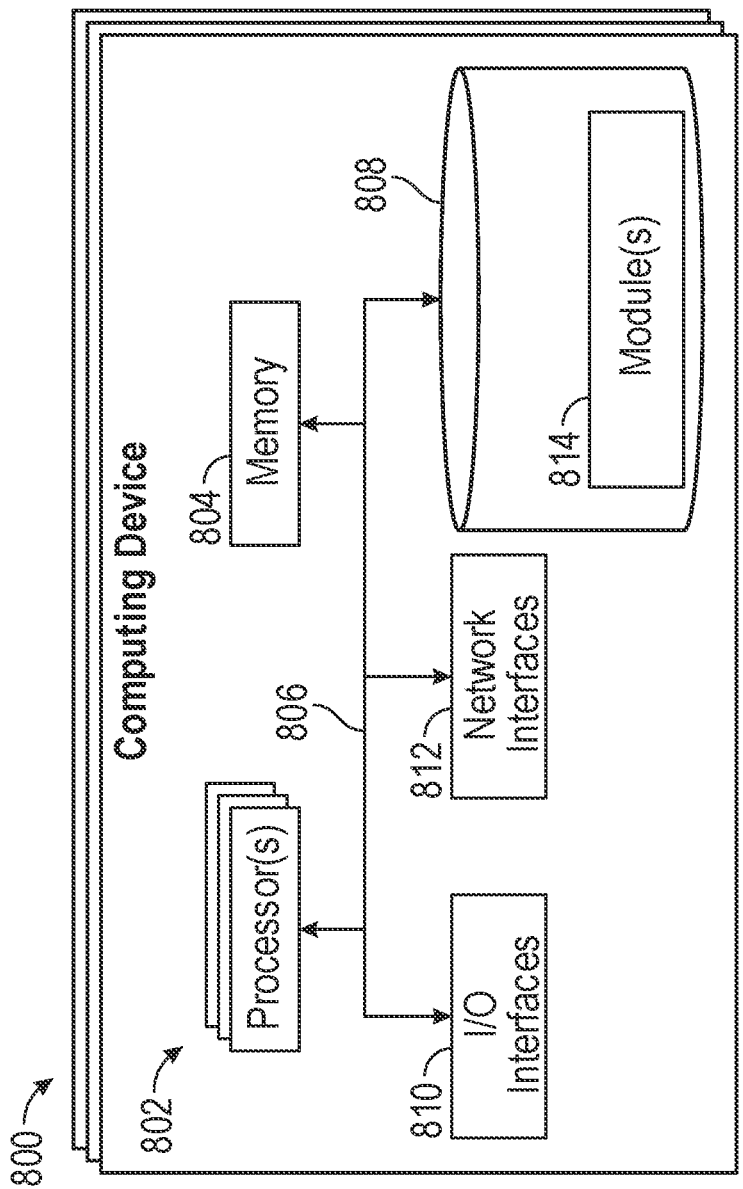
FIG. 8 depicts an example network architecture, in accordance with one or more example embodiments of the disclosure.

FIG. 8 depicts an example network 800 architecture, in accordance with one or more example embodiments of the disclosure. In particular, the network 800 depicted in FIG. 8 may include may include a single MAC controller 804. The MAC controller may be located within a headend 802, for example, but may similarly be located in any other part of the network 800. The network 800 may separate out the functionality of a CMTS into a MAC layer device (for example, the MAC controller 804) and a PHY layer device 808, as may be described in further detail below. Networks, such as network 800, making use of remote PHY devices 808 may use at least two different methods of transmitting data packets. In a first method depicted in network 800, a hardware-based MAC layer device 804 (the terms "MAC layer device" and "MAC controller" may be used interchangeably herein) may receive incoming data packets and may transmit the data packets to a remote PHY device 808 over fiber 807 (for example, digital fiber). In some embodiment, the data packets may be transmitted to another device (for example, a customer premise equipment) using the remote PHY device 808. In particular, the data packets can be transmitted from the remote PHY device 808 on coaxial fiber (for example coaxial fiber on leg 813, leg 814, and/or leg 815 of the PHY device 808) to a customer (for example, to a customer's premise equipment (CPE), such as a cable modem). Additionally, one or more amplifiers (not shown in the figure) may be used to prevent the attenuation of the signal.

As noted, in some embodiments, networks making use of remote PHY devices 804 may use at least two different methods of transmitting data packets, the first method of which was described above. A second method to transmit data packets on the network may involve performing aspects of the above transmission in software (for example, in a cloud computing environment). In such a case, the MAC layer 802 functionality may be software-implemented (for example, in the cloud), and such functionality may be referred to as a virtual MAC (VMAC) layer 802. Accordingly, as packets are received (for example, from another device such as a headend) and processed by the VMAC 802, the data packets may then be transmitted out (for example, using Ethernet switches, hubs, routers, and the like) to the remote PHY device 808 over fiber 807 (for example, digital fiber). From the remote PHY device 808 the data packets may be transmitted over coaxial cables (for example coaxial fiber on leg 813, leg 814, and leg 815 of the PHY device 808) to a customer using one or more amplifiers (not shown in the figure) to reduce the attenuation of the signal. For example, the data packets may be transmitted to a customer's premise equipment (CPE) (for example, CPE 822, CPE 823, and CPE 824, CPE 825, CPE 826, CPE 827, and CPE 828, CPE 829, CPE 830, CPE 831, CPE 832, and/or CPE 833, as well as any other number of CPEs), such as a cable modem. It should be noted that although reference is made herein to certain portion of the network using fiber cables and certain portions using coaxial cables, these same portions may also include any other type of transmission cable as well.

In some embodiments, a cable modem termination system (CMTS) may include devices that represent layer-1, layer-2, and/or any other layer functionality of the Open Systems Interconnection (OSI) model used in connection with cable networks. In some embodiments, devices that represent the layer-1, layer-2, and/or any other layer functionality may have a system architecture wherein all the devices are placed in one chassis, that is, in one chassis in one geographical location. In another embodiment, in a remote PHY topology, the layer-1 and/or layer-2 devices can exist in a different chassis that may be distributed throughout the network 100. In some embodiments, the various layer-1 and/or layer 2 devices in the distributed architecture described herein can communicate with one another using an Ethernet-based protocol. In another embodiment, the various devices (that is the layer-1 and/or layer-2 devices) can communicate using a downstream external PHY interface (DEPI) protocol, for example, between a layer-2 device to a layer-1 device. In another embodiment, the DEPI protocol can be used between devices that both have MAC functionality. In some embodiments, the various devices can use an upstream external PHY interface (UEPI) protocol to communicate between devices of different layer types, for example, between devices having MAC functionality.

In some embodiments, the different layer devices (for example layer-1 and/or layer-2 devices) can communicate using a tunneling protocol and/or method, such as, a layer-2 virtual private network (VPN) tunnel, a generic router encapsulation (GRE) and/or a pseudowire. In some embodiments, the pseudowire can refer to an emulation of a point-to-point connection over a network. In some embodiments, the pseudowire can be used to transport frames (for example, DOCSIS frames), over a cable network. In some embodiments, the pseudowire can use a layer two tunneling protocol (L2TP) underlying protocol. In another embodiment, the pseudowire and/or tunnel can use an internet telephony (IP) protocol, such as IPv6 and/or IPv4.

In some embodiments, the DEPI protocol, the UEPI protocol, and/or a generic control plane (GCP) protocol can control aspects of the delivery of Data Over Cable Service Interface Specification (DOCSIS) frames between devices. In some embodiments, DEPI can represent a pseudowire that can connect frames (such as DOCSIS downstream MAC frames) from device from one layer (such as a layer-2 device), to a device from a different layer (for example, a layer-1 device). In some embodiments the devices from the different layers can be provided in separate locations. In some embodiments, the different layer devices can be connected using a common timing source. In some embodiments, the DEPI protocol, the UEPI protocol, and/or the GCP protocol used by the different layer devices (for example layer-1 and/or layer-2 devices) can be used to set up a session and tear down a session between the different layer devices.

In some embodiments, as used herein, the physical (PHY) layer may represent a fundamental layer in the OSI stack underlying the logical data structures of higher level functions (for example, the MAC layer) in a network. For example, the PHY layer may refer to layer-1 of the OSI stack. A PHY layer device may only include layer-1 functionality, or may also include a combination of any number of functionalities of any of the layers of the OSI stack. The physical layer can define the means of transmitting raw bits rather than logical data packets over a physical link connecting network nodes. The bit stream may be grouped into code words or symbols and may be converted to a physical signal that is transmitted over a hardware transmission medium (e.g., coaxial cable). The physical layer may provide an electrical and procedural interface to the transmission medium. The physical layer may include the shapes and properties of the electrical connectors, the frequencies to broadcast on, the modulation scheme to use and the like. In some instances, any of the PHY devices herein may only include PHY functionality and may not include any other OSI stack functionality. However, in some embodiments, the PHY devices may include other layer functionality of the OSI stack as well, such as MAC layer functionality, or any other functionality.

In some embodiments, the MAC layer may represent a fundamental layer in the OSI stack that may provide addressing and/or channel access control mechanisms that can allow several terminals or network nodes to communicate within a multiple access network that incorporates a shared medium, for example an Ethernet, cable, telecommunications, wireless, or other type of network. For example, the MAC layer may refer to layer-2 of the OSI stack. A MAC layer device may only include layer-2 functionality, or may also include a combination of any number of functionalities of any of the layers of the OSI stack. In some embodiments, the MAC layer can act as an interface and/or intermediary layer between the application layer and the network's physical layer. In some embodiments, the MAC layer can emulate a full-duplex logical communication channel in a multi-point network. Multipoint networks can include, but not be limited to, wireless Internet and IP telephony networks, for example, using gigahertz radio frequencies. This channel may provide unicast, multicast or broadcast communication service. Further some functions performed by the MAC layer can include frame delimiting and recognition, addressing of destination network nodes (both as individual nodes and as groups of nodes), conveying of addressing information, protecting against errors, for example by generating and/or checking frame check sequences, and controlling access to the physical transmission medium. The MAC layer can be implemented by numerous devices, including, but not limited to, a cable modem termination system (CMTS), an optical line termination (OLT), or a wireless access point (WAP), and the like. In various embodiments, layer-2 devices (for example the MAC layer devices) can perform mapping operations. For example, the layer-2 devices (for example the MAC layer devices) can associate a service flow identifier to a data group and/or a service group, for example, as a part of a bonding group.

In some examples, the functionality of one or more layers (for example, layer-1 and layer 2, as well as any other layers) may be combined. In some embodiments described herein the functionality of the layer-1 and the functionality of layer-2 may be performed by separate devices, (for example, split MAC/PHY devices). In another embodiment described herein the functionality of the layer-1 and the functionality of layer-2 may be incorporated into separate devices, to create a fully distributable set of devices. Further, layer-2 functionality (for example a CMTS and/or an OLT functionality for wireless access point (WAP) functionality) can be provided by a separated module/device. Moreover, layer-1 (the PHY layer) can be provided by a separated module/device.

In some embodiments, the various devices incorporating different layer functionality can be separated geographically. For example, a layer-2 device may be placed at a predetermined distance away from a layer-1 device. In some examples, the distance may be 1 mile, 10 miles, 100 miles and/or the like. The layer-2 device can communicate (for example serialize and/or send data frames and/or packets) with the layer-1 device. For example, the layer-2 device can use one or more lookup tables, the lookup tables having information including, but not limited to, topology information, bridging information, and/or layer-2 device (for example MAC 2, Cable Modem 2, and/or wireless device) information (for example identification information, bandwidth capability information, location information, and the like). In some embodiments, the layer-2 device can perform global service flow classification and/or basic service flow. The layer-2 device may have source address verification (SAV) policing. In various embodiments, the layer-1 device can perform one or more of the classification routines that can be performed in the MAC layer.

It should be noted that although the description above may refer only to layer-1 and/or layer-2 devices this may only be for exemplification purposes, and any other devices including functionality of any combination of layers in the OSI stack may similarly be applicable.

In various aspects, the MAC device 802 and/or the remote PHY device 804 may include aspects of the functionality of the computing entity 700, as shown and described in connection with FIG. 7 above. In particular, the MAC device 802 and/or the remote PHY device 804 may include or be in communication with one or more processing(s) 802, memory 804, etc.

That which is claimed is:

1. A system comprising:
    a first customer premises device (CPE) configured to transmit and receive data over a Data Over Cable Service Interface Specification (DOCSIS) network according to a first spectrum plan, wherein the first CPE is configured to transmit upstream data in a first frequency range between a first frequency and a second frequency by default based on the first spectrum plan;
    a second CPE configured to transmit and receive data over the DOCSIS network according to a second spectrum plan, wherein the second CPE is configured to transmit upstream data in a second frequency range between the first frequency and a third frequency by default based on the second spectrum plan,
    wherein the first spectrum plan and second spectrum plan include at least one of: a sub-split spectrum plan, a mid-split spectrum plan, or a high-split spectrum plan, and
    wherein the first CPE is further configured to receive downstream data in a third frequency range between the second frequency and a fourth frequency according to the first spectrum plan;
    a processor; and
    memory storing computer-executable instructions that, when executed by the processor, cause the processor to:
    determine an overlap between the second frequency range and the third frequency range; and
    cause to send, based on the overlap, a MAC management message indicating for the first CPE to receive the downstream data outside of the second frequency range.

2. The system of claim 1, wherein the system further comprises a third CPE configured to transmit and receive data on the DOCSIS network using a third frequency spectrum, wherein the third CPE is configured to transmit upstream data in a third frequency range between the third frequency and a fourth frequency, and wherein the computer-executable instructions further cause the processor to:
    cause to send an indication to the first CPE to transmit and receive data outside of the second frequency range and the third frequency range; and
    cause to send an indication to the second CPE to transmit and receive data outside of the third frequency range.

3. The system of claim 2, wherein the system further comprises a fourth CPE configured to transmit and receive data on the DOCSIS network using a fourth frequency spectrum, wherein the fourth CPE is configured to transmit upstream data in a fourth frequency range between the fourth frequency and a fifth frequency, and wherein the computer-executable instructions further cause the processor to:
    cause to send an indication to the first CPE to transmit and receive data outside of the second frequency range, the third frequency range, and the fourth frequency range;
    cause to send an indication to the second CPE to transmit and receive data outside of the third frequency range and the fourth frequency range; and
    cause to send an indication to the first CPE to transmit and receive data outside of the fourth frequency range.

4. The system of claim 1, wherein causing to send the indication further comprises including a field within a first downstream channel description message of the MAC management message, wherein the field includes a first DOCSIS protocol version used by at least one of the first CPE, and wherein the first downstream channel description message is sent to the first CPE and the second CPE.

5. The system of claim 4, wherein causing to send the indication further comprises providing an indication of a second DOCSIS protocol version within a second downstream channel description message, wherein the first DOCSIS protocol version and second DOCSIS protocol version are different.

6. The system of claim 1, wherein causing to send the indication further comprises providing an indication of a first DOCSIS protocol version within a first upstream channel description message.

7. The system of claim 1, wherein the first CPE and the second CPE include a first modem and a second modem, wherein the first modem and second modem are both downstream from a single tap device in the DOCSIS network.

8. A method, comprising:
- determining, by a processor, that a first customer premises device (CPE) configured to transmit and receive data over a Data Over Cable Service Interface Specification (DOCSIS) network according to a first spectrum plan, wherein the first CPE is configured to transmit upstream data in a first frequency range between a first frequency and a second frequency by default based on the first spectrum plan;
- determining, by the processor, a second CPE configured to transmit and receive data over the DOCSIS network according to a second spectrum plan, wherein the second CPE is configured to transmit upstream data in a second frequency range between the first frequency and a third frequency by default based on the second spectrum plan,
- wherein the first spectrum plan and second spectrum plan include at least one of: a sub-split spectrum plan, a mid-split spectrum plan, or a high-split spectrum plan, and
- wherein the first CPE is further configured to receive downstream data in a third frequency range between the second frequency and a fourth frequency according to the first spectrum plan;
- determining an overlap between the second frequency range and the third frequency range; and
- causing, by the processor and based on the overlap, to send an indication to a first customer premises device (CPE) of a Data Over Cable Service Interface Specification (DOCSIS) network to transmit and receive data outside of a second frequency range.

9. The method of claim 8, wherein the DOCSIS network further comprises a third CPE configured to transmit and receive data on the DOCSIS network using a third frequency spectrum, wherein the third CPE is configured to transmit upstream data in a third frequency range between the third frequency and a fourth frequency, and wherein the method further comprises:
- causing to send an indication to the first CPE to transmit and receive data outside of the second frequency range and the third frequency range; and
- causing to send an indication to the second CPE to transmit and receive data outside of the third frequency range.

10. The method of claim 9, wherein the DOCSIS network further comprises a fourth CPE configured to transmit and receive data on the DOCSIS network using a fourth frequency spectrum, wherein the fourth CPE is configured to transmit upstream data in a fourth frequency range between the fourth frequency and a fifth frequency, and wherein the method further comprises:
- causing to send an indication to the first CPE to transmit and receive data outside of the second frequency range, the third frequency range, and the fourth frequency range;
- causing to send an indication to the second CPE to transmit and receive data outside of the third frequency range and the fourth frequency range; and
- causing to send an indication to the first CPE to transmit and receive data outside of the fourth frequency range.

11. The method of claim 8, wherein causing to send the indication further comprises providing an indication of a first DOCSIS protocol version within a first downstream channel description message, wherein the first downstream channel description message is sent to the first CPE and the second CPE.

12. The method of claim 11, wherein causing to send the indication further comprises providing an indication of a second DOCSIS protocol version within a second downstream channel description message, wherein the first DOCSIS protocol version and second DOCSIS protocol version are different.

13. The method of claim 8, wherein causing to send the indication further comprises providing an indication of a first DOCSIS protocol version within a first upstream channel description message.

14. The method of claim 8, wherein the first CPE and the second CPE include a first modem and a second modem, wherein the first modem and second modem are both downstream from a single tap device in the DOCSIS network.

15. A device comprising:
- a processor; and
- a memory storing computer-executable instructions that, when executed by the processor, cause the processor to:
  - determine that a first customer premises device (CPE) configured to transmit and receive data over a Data Over Cable Service Interface Specification (DOCSIS) network according to a first spectrum plan, wherein the first CPE is configured to transmit upstream data in a first frequency range between a first frequency and a second frequency by default based on the first spectrum plan;
  - determine a second CPE configured to transmit and receive data over on the DOCSIS network according to a second spectrum plan, wherein the second CPE is configured to transmit upstream data in a second frequency range between the first frequency and a third frequency by default based on the second spectrum plan,
  - wherein the first spectrum plan and second spectrum plan include at least one of: a sub-split spectrum plan, a mid-split spectrum plan, or a high-split spectrum plan, and
  - wherein the first CPE is further configured to receive downstream data in a third frequency range between the second frequency and a fourth frequency according to the first spectrum plan;
  - determine an overlap between the second frequency range and the third frequency range; and
  - cause to send, based on the overlap, an indication to a first customer premises device (CPE) of a Data Over Cable Service Interface Specification (DOCSIS) network to transmit and receive data outside of a second frequency range.

16. The device of claim 15, wherein the DOCSIS network further comprises a third CPE configured to transmit and receive data on the DOCSIS network using a third frequency spectrum, wherein the third CPE is configured to transmit upstream data in a third frequency range between the third frequency and a fourth frequency, and wherein the computer-executable instructions further cause the processor to:
- cause to send an indication to the first CPE to transmit and receive data outside of the second frequency range and the third frequency range; and
- cause to send an indication to the second CPE to transmit and receive data outside of the third frequency range.

17. The device of claim 16, wherein the DOCSIS network further comprises a fourth CPE configured to transmit and receive data on the DOCSIS network using a fourth frequency spectrum, wherein the fourth CPE is configured to transmit upstream data in a fourth frequency range between the fourth frequency and a fifth frequency, and wherein the computer-executable instructions further cause the processor to:
- causing to send an indication to the first CPE to transmit and receive data outside of the second frequency range, the third frequency range, and the fourth frequency range;
- cause to send an indication to the second CPE to transmit and receive data outside of the third frequency range and the fourth frequency range; and
- cause to send an indication to the first CPE to transmit and receive data outside of the fourth frequency range.

18. The device of claim 15, wherein causing to send the indication further comprises providing an indication of a first DOCSIS protocol version within a first downstream channel description message, wherein the first downstream channel description message is sent to the first CPE and the second CPE.

19. The device of claim 18, wherein causing to send the indication further comprises providing an indication of a second DOCSIS protocol version within a second downstream channel description message, wherein the first DOCSIS protocol version and second DOCSIS protocol version are different.

20. The device of claim 15, wherein causing to send the indication further comprises providing an indication of a first DOCSIS protocol version within a first upstream channel description message.

* * * * *